United States Patent Office 2,753,366
Patented July 3, 1956

2,753,366
PRODUCTION OF ISOBUTYL ALCOHOL

Hans Joachim Pistor, Ludwigshafen (Rhine), Germany, assignor to Badische Anilin- & Soda-Fabrik Aktiengesellschaft, Ludwigshafen (Rhine), Germany No Drawing. Application June 27, 1952,
Serial No. 296,097

Claims priority, application Germany July 13, 1951

8 Claims. (Cl. 260—449)

This invention relates to the production of alcohols, in particular isobutyl alcohol.

It is known that in the reaction of carbon monoxide with hydrogen to form oxygen-containing hydrocarbon derivatives the yield of isobutyl alcohol can be improved by introducing methyl alcohol simultaneously into the reaction vessel with the initial gases. It has also been proposed to add normal-propyl alcohol to the initial materials for the same purpose.

I have now found that the yield of isobutyl alcohol is particularly greatly increased in the reaction of carbon monoxide and hydrogen by introducing into the reaction vessel, instead of or in addition to normal-propyl alcohol, the corresponding aldehyde (propionaldehyde) or the corresponding acid (propionic acid) or its esters with alcohols which contain less than 4 carbon atoms in the molecule. The corresponding compounds of allyl alcohol, and also allyl alcohol itself, also effect an increase in the yield of isobutyl alcohol. As esters there may be mentioned for example the methyl or propyl ester of propionic acid or acrylic acid. In addition to these substances, of which two or more may be employed simultaneously, there may also be added one or more low molecular alcohols, as for example methyl, ethyl or normal-propyl alcohol, or their esters, in particular the formic or acetic acid esters.

The hydrogenation of the carbon monoxide is carried out at temperatures of about 350° to 500° C. and at pressures of about 200 to 800 atmospheres in the presence of the catalysts known for this reaction. The amount of the said alcohols, aldehydes and the like added is 3 to 80% with reference to the liquid product obtained.

The following examples will further illustrate this invention but the invention is not limited to these examples. The parts are by volume and the percentages are by volume unless otherwise specified.

Example 1

33,500 parts of a mixture containing 25% of carbon monoxide, 62% of hydrogen and 7.5% of carbon dioxide are led per hour at 430° C. and 300 atmospheres over 2.7 parts of an alkalized zinc chromate catalyst. 0.5 part of propionaldehyde per hour is introduced into the reaction vessel.

There are obtained per hour 2.8 parts of liquid product which, in addition to 2.4% of normal-propyl alcohol, contains 19.5% of isobutyl alcohol and 6.0% of higher alcohols.

By working under otherwise identical conditions, but while supplying 0.5 part of methyl alcohol instead of the propionaldehyde, there are obtained 2.7 parts of liquid product which, besides 1.0% of normal-propyl alcohol, contains only 11.9% of isobutyl alcohol and 5.3% of higher alcohols.

Example 2

33,500 parts of a mixture of carbon monoxide and hydrogen of the composition specified in Example 1 are led per hour over 2.7 parts of an alkalized zinc chromate catalyst at 425° C. and 300 atmospheres. 0.5 part of propionic acid methyl ester is introduced per hour into the reaction vessel.

There are obtained per hour 3.1 parts of liquid product which is practically free from methyl propionate and which, besides 2.17% by weight of normal-propyl alcohol, contains 14.65% by weight of isobutyl alcohol and 9.53% by weight of higher alcohols. If 0.4 part of acrolein be supplied per hour instead of the ester, the conditions being otherwise identical, there are obtained 3.1 parts of liquid product containing 13.7% by weight of isobutyl alcohol.

By working under otherwise identical conditions, but while supplying 0.5 part of methyl alcohol per hour, 2.7 parts of liquid product are obtained which, besides 1.6% by weight of normal-propyl alcohol, contains only 10.17% by weight of isobutyl alcohol and 7.54% by weight of higher alcohols.

What I claim is:

1. In a process for the production of isobutyl alcohol by hydrogenation of carbon monoxide in the presence of an alkalized zinc chromate catalyst, the improvement which comprises supplying to the reaction vessel at least one compound selected from the group consisting of propionaldehyde, propionic acid, allyl alcohol, acrolein, acrylic acid, and the esters of propionic acid and acrylic acid with alcohols containing less than 4 carbon atoms in the molecule.

2. The process as claimed in claim 1 wherein to the reaction vessel is supplied besides at least one of the said compounds at least one compound selected from the group consisting of methyl, ethyl and propyl alcohol.

3. The process as claimed in claim 1 wherein to the reaction vessel is supplied from 3 to 80% of the said compounds with reference to the liquid product obtained.

4. The process as claimed in claim 1 wherein the hydrogenation of the carbon monoxide is carried out at temperatures of 350 to 500° C.

5. The process as claimed in claim 1, wherein the hydrogenation of the carbon monoxide is carried out at pressures of 200 to 800 atmospheres.

6. The process for the production of isobutyl alcohol which comprises hydrogenating carbon monoxide in the presence of an alkalized zinc chromate catalyst at a temperature of about 350 to 500° C. and at a pressure of about 200 to 800 atmospheres while supplying to the reaction zone an amount of propionaldehyde equivalent to about 3 to 80% by volume of the liquid product obtained.

7. The process for the production of isobutyl alcohol which comprises hydrogenating carbon monoxide in the presence of an alkalized zinc chromate catalyst at a temperature of about 350 to 500° C. and at a pressure of about 200 to 800 atmospheres while supplying to the reaction zone an amount of methyl propionate equivalent to about 3 to 80% by volume of the liquid product obtained.

8. The process for the production of isobutyl alcohol which comprises hydrogenating carbon monoxide in the presence of an alkalized zinc chromate catalyst at a temperature of about 350 to 500° C. and at a pressure of about 200 to 800 atmospheres while supplying to the reaction zone an amount of acrolein equivalent to about 3 to 80% by volume of the liquid product obtained.

References Cited in the file of this patent

UNITED STATES PATENTS

| 1,562,480 | Wietzel et al. | Nov. 4, 1925 |
| 1,996,101 | Dreyfus | Apr. 2, 1935 |
| 2,636,046 | Gresham | Apr. 21, 1953 |

OTHER REFERENCES

Frolich et al.: "Ind. and Eng. Chem.," vol. 22, pages 1051 to 1057 (1930).

Graves: "Ind. and Eng. Chem.," vol. 23, pages 1381 to 1385 (1931).